United States Patent [19]
Robinson

[11] 4,065,745
[45] Dec. 27, 1977

[54] DOPPLER SPEEDOMETER

[75] Inventor: Kermit Hamlin Robinson, Weston, Mass.

[73] Assignee: Harnessed Energies, Inc., Maynard, Mass.

[21] Appl. No.: 685,266

[22] Filed: May 11, 1976

[51] Int. Cl.² .................................................. G01S 9/66
[52] U.S. Cl. ........................................ 340/3 D; 343/8
[58] Field of Search ...................... 340/3 D; 343/8, 9; 73/194 A

[56] References Cited

U.S. PATENT DOCUMENTS

| | | | |
|---|---|---|---|
| 3,065,463 | 11/1962 | Turner | 340/3 D |
| 3,094,693 | 6/1963 | Taylor | 340/3 D |
| 3,437,987 | 4/1969 | Burg | 340/3 D |
| 3,525,976 | 8/1970 | Wilcox et al. | 340/3 D |

Primary Examiner—Richard A. Farley
Attorney, Agent, or Firm—Kenneth E. Merklen; Thomas E. Harrison, Jr.

[57] ABSTRACT

A Doppler Speedometer for determining the speed of a vehicle, suspended in a medium, relative to the ground over which the vehicle is traveling. Radiant energy is beamed from the vehicle toward the ground at a predetermined angle with respect to the direction of travel of the vehicle. The reflected energy is received and a signal representing the envelope of the amplitude modulation function of the returned energy is generated. An output voltage having a value proportional to some characteristics of the frequency spectrum of the return signal is generated for driving a meter calibrated in vehicle speed.

27 Claims, 4 Drawing Figures

DOPPLER SPEEDOMETER

This invention relates to velocity measuring devices and more particularly relates to Doppler velocity measuring devices operating in the sonic range of frequencies in a water environment. The apparatus employing the principals of this invention is particularly useful in detecting, measuring and indicating the relative movement between a water vehicle, such as a ship or boat, in the water, and the bottom of the water, such as a river bed, sea bottom or ocean bottom, over which the vehicle is traveling.

Different methods have been used to measure the velocity or speed of a water vehicle, such as a ship or boat (hereinafter referred to as "ship") in or on the water. Most ship's speed or velocity measuring devices measure the ship's speed relative to the water in or on which it is traveling, when actually a more meaningful speed measurement is the speed or velocity of the ship with respect to the ground, or water bottom over which the ship is traveling. Movement of a ship through the water, and measurement of such movement has been accomplished by the use of sensors coupled to the ship which sense the water flow relative to the ship. In addition to the obvious drawback that such sensors are determining movement of the ship relative to the water rather then the ground over which the ship is traveling, (which is here considered ground speed), some such senors depend on moving parts and/or project into the water and/or include small orifices, all of which are subject to being damaged or fouled.

More sophisticated ship velocity measuring apparatus using the Doppler Effect principal have been used to detect the motion of a ship relative to the ground or earth beneath the ship with some success. However, these more sophisticated velocity measuring system are very complex and are expensive. These systems have universally transmitted a pulsed, narrow beam of radiant energy at some angle, other than perpendicular to the direction of travel, some time using a single angularly disposed beam of energy and other times using two (forward directed and aftward directed) angularly disposed beams of energy. The use of a narrow, directional beam almost requires high frequency, especially in the ultra-sonic range, which propagates poorly in a water environment, which necessitates high power requirements. Pulse systems require intricate timing circuits with minimum and maximum depth operating limitations. Errors are inherently introduced into systems of this type by factors such as pitching, rocking and vertical motion of the ship relative to the ocean bottom. In addition, the vertical distance between the bottom of the ship and the bottom of the ocean or ground or earth (hereinafter referred to as "ocean bottom") is substantially constantly changing as the ship moves through the water. This substantially ever changing factor has great effect on pulse rate, pulse length, power requirement and depth at which such pulse system will operate effectively. These problems are amplified when the system uses angularly propagated beams. Some of these problems have been overcome, but at the cost of complex, sophisticated and expensive electronics as well as the use of multiple transmitting and/or receiving devices. The end result here is a very costly, highly complex instrument.

The present invention overcomes many of the problems associated with prior ship velocity or speed detectors or indicators. The present ship speed detector measures ground speed of the ship, that is, ship speed or velocity relative to the ocean bottom over which the ship is traveling. By accumulating the ship speed over a time period the distance actually traveled by the ship during that period may be provided or indicated, similar to that shown on a trip mileage indicator or an odometer on an automobile, for example.

In accordance with the invention herein, a velocity measuring device, particularly for measuring and indicating the ground speed of a ship on, in or under, (hereinafter referred to as "in") the water is provided which device employs a transmitter which generates and transmits a carrier signal at 200,000 Hertz or cycles (200KHz) into and through the water in which the ship is moving, the signal being directionally propagated substantially perpendicular to the line of travel of the ship, and toward the ground over which the ship is moving. A receiver is provided on the ship which receives the signal returned by the ground reflecting such signal to the ship, which signal is Doppler shifted somewhat in frequency both above and below the carrier frequency of 200KHz in accordance with the velocity of the ship with respect to the ground reflecting or returning the transmitted signal. The received signal is amplified and analyzed and the envelope representing the amplitude modulation function of the received signal is separated from the carrier signal by use of a demodulator. The output of the demodulator is coupled to the next stage, which analyzes the signal providing a resultant output which drives a meter calibrated in ship speed. Signal analysis is accomplished by use of a threshold crossing detector which looks at the frequency of the amplitude modulation function of the returned, shifted signal and detects the number of threshold crossing per second, of the signal providing both a digital and analog value of the AM signal. A voltage output which is linearly proportional to the frequency of the AM signal is provided and is applied to an analog voltage responsive meter which may be calibrated in miles per hour or knots. The digital function of the voltage output may be applied to counter which, on a time basis, may accumulate the digital characteristics of the AM signal. By accumulating the digital characteristics of the AM signal over a time period the miles traveled per leg or per trip or the accumulated mileage of the ship may be indicated on a trip meter or odometer.

It is therefore an object of the present invention to provide an inexpensive speedometer of the Doppler type operating with single beam transmission of radiation energy.

Another object is to prrovide a Doppler Effect speedometer for a vehicle traveling in a medium in which the amplitude modulation of the Doppler shifted returned signal is analyzed and the resultant is used as a measure of vehicle ground speed.

Another object is to provide a Doppler Effect speedometer for a ship traveling in water which uses transmission of a substantially vertically propagated beam of radiant energy.

Another object is to provide a Doppler speedometer for a ship traveling in water which indicates speed of the ship with respect to the ground or ocean bottom over which the ship is traveling and indicates miles traveled by such ship over the ocean bottom.

Another object is to provide a Doppler speedometer for indicating the speed of a ship over the bottom of the water in which the ship is traveling which is virtually insensitive to rock, pitch and vertical motion of the ship in the water.

Another object is to provide a Doppler speedometer for indicating the speed of a ship in water with respect to the ocean bottom over which the ship is traveling which is virtually insensitivie to changes in contour of the ocean bottom and depth of the water, within operating limits of the device.

These and other objects will become apparent when reading the following detailed description with reference to the accompanying drawings in which.

Figures 3, 4:
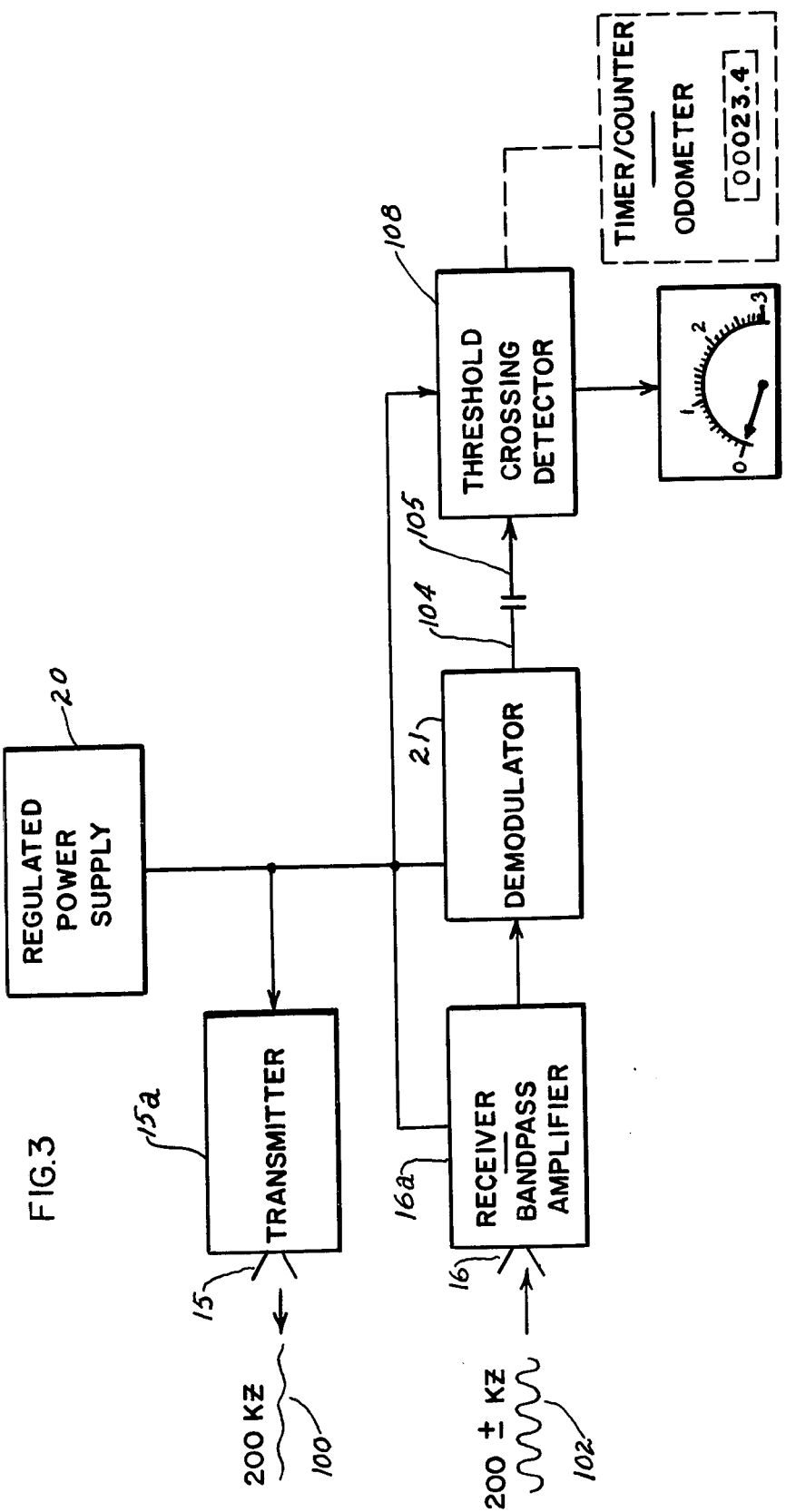
FIG. 3 is a block diagram of the invention.

FIG. 4 schematically represents a sine wave crossing at zero point.

Figure 1:
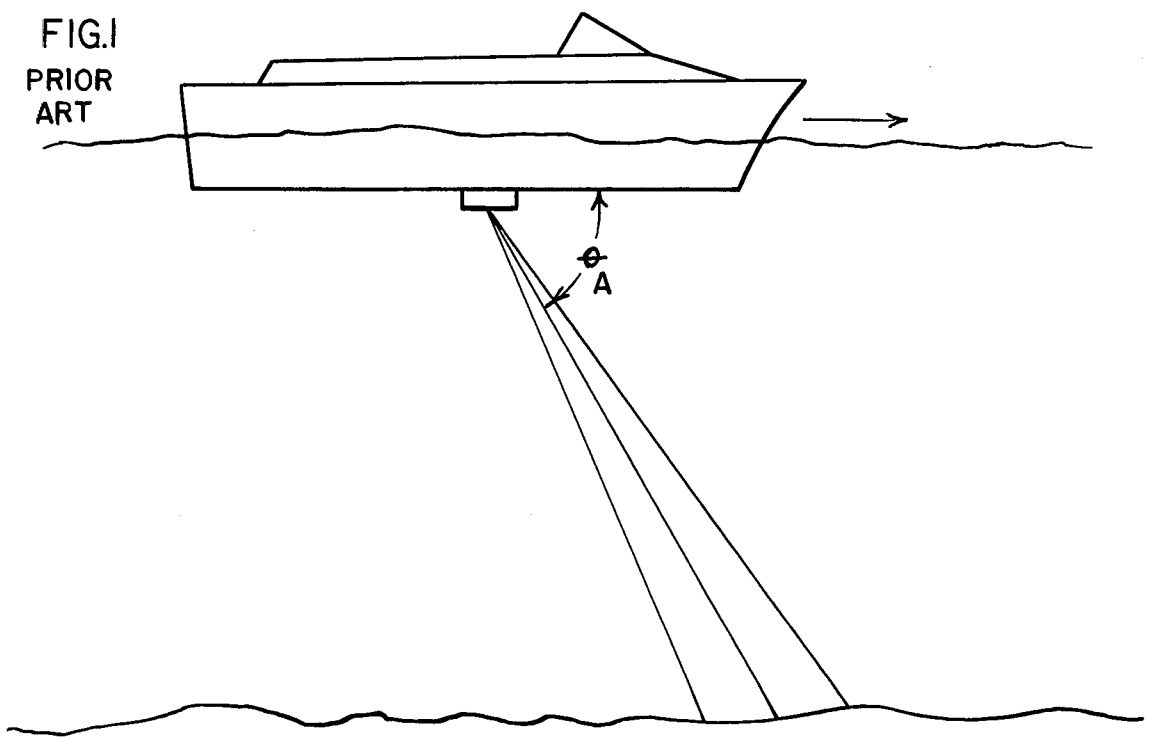
FIG. 1 is a representation of beam propagation of a prior art water vehicle speed detection system.
Figure 2:
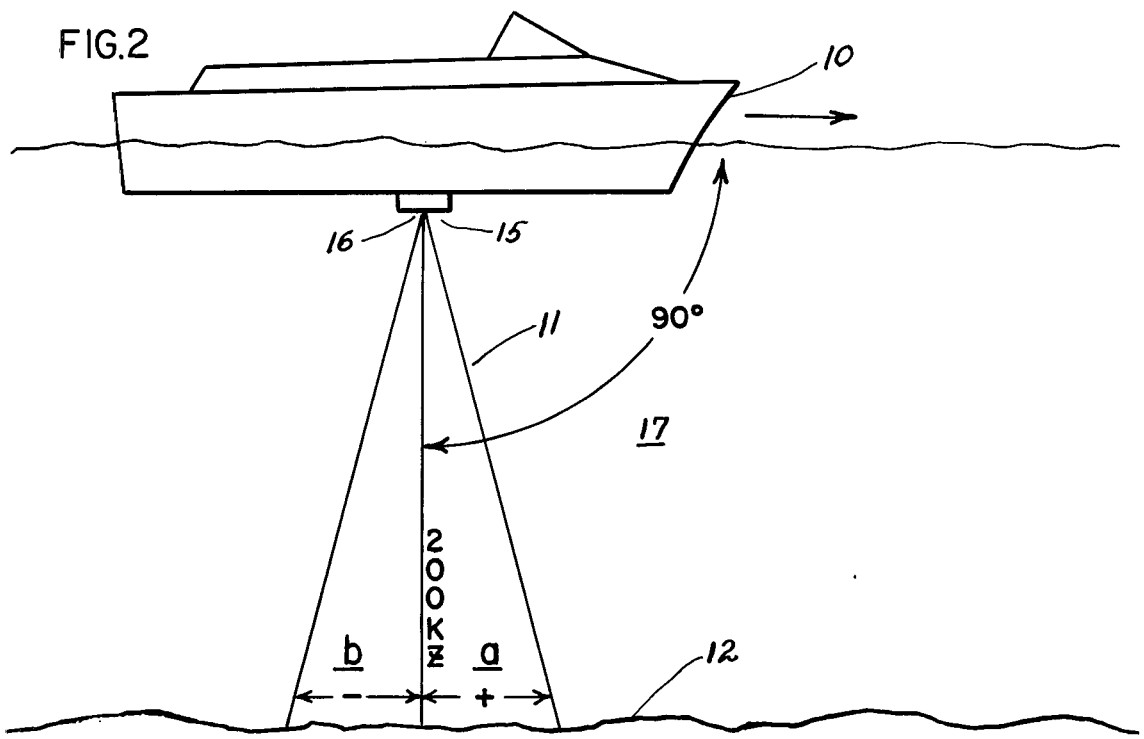
FIG. 2 is a representation of beam propagation of the present invention.

In one embodiment, which has been used with success, two off-the-shelf transducers, MODEL 60140 manufactured by Linden Laboratories, Inc. of Box 920, State College, Pa. are separately coupled to the hull of a ship, 10 such as represented in FIG. 2. One transducer, 15 is used for transmitting a signal, 11 in the sonic range, directed toward the ocean bottom, 12 over which the ship is traveling. In this embodiment, an ultra-sonic signal was used, having a frequency of 200KHz, the signal being transmitted in continuous wave form. The 200KHz signal is substantially directional and is directed at an angle substantially perpendicular to the line of travel of the ship, and toward the ocean bottom, 12. The other transducer, 16 is preferably position aft of the transmitting transducer, with respect to the line of forward travel of the ship and is used for receiving the return-transmitted signal, reflected from the ground or earth 12 over which the ship is traveling.

Although the successful embodiment was used on a ship traveling in water, the principals of the present invention may be used for determining and indicating ground speed of any vehicle in water or air. The transmitted signal used in the successful embodiment is in the sonic range of frequencies, however, practice of the invention is not limited to transmission of signals in the sonic range and signals in other frequency ranges can be used if desired. Although the disclosed embodiment is in continuous signal transmission form the principals disclosed herein are valid when used in a pulse signal transmission system.

The transducers are isolated from each other to reduce direct cross talk between them. The transducers may be suitably mounted either with full or transom mounts with the sound box or cavity of each covered by a sound absorbing material, such as a closed cell foam rubber, to block any stray sound. The sound cavity of each transducer may include a masking sheet of sound absorbing material over the opening through which the radiated sound waves are propagated into the water which has slits of sufficient length and width to permit radiation of the 200KHz carrier signal in the water environment as a virtual beam, directed to the ocean bottom, as far as the transmitting transducer is concerned, and permit reception of the Doppler shifted, reflected 200± KHz signal returned via reflection from the ocean bottom, by the receiving transducer.

The block, 15a in the block diagram of FIG. 3 represents an oscillator for generating a 200KHz signal. Preferably the oscillator is a stable oscillator, or square wave generator, and may be a crystal controlled oscillator which generates a 200KHz signal. The signal is transmitted into the water employing a horn with directional characteristics. The beam fan area $a$ and $b$ represent areas of particular interest with respect to the Doppler Effect on the propagated beam.

The regulated power supply, 20 may be driven by a battery or other power source available on the ship. A regulated power system sufficient to drive the Doppler sppedometer may be rated at least at one amp output and provides three voltage levels, for example +5 volts −5 volts and ground at 0 voltage level. The regulated supply is used to drive a digital, gateable 200KHz square wave generator which is stable within 1%, over the temperature range of 0° to 55° C. The 200KHz signal is connected to the transmitting element of the transducer 15 and is coupled to the water environment for directing the center of the beam essentially perpendicular to the direction of travel of the ship through the water.

The signal is transmitted toward the ocean bottom, 12 with signal directed substantially perpendicular to the line of travel, the beam essentially fanning forward and aft of the perpendicular so as to form a forward fan $a$ and an aft fan $b$. The 200KHz beam will be Doppler shifter upon interception of the beam by the ocean bottom, 12 and returned with a spectrum of frequencies both above and below the carrier frequency of 200KHz. The Doppler effect on the signal in the forward fan $a$ segment of beam will be a positive shift so that the frequency of the return signal is somewhat higher than the frequency of the carrier signal while the Doppler effect on the signal in the aft fan $b$ segment of the beam will be a negtive shift so that the frequency of the return signal is somewhat lower than the frequency of the carrier signal. The frequency shift caused by the Doppler effect on the return signal is a function of the movement between the source of the signal, the ship 10, and the ocean bottom or ground 12, the magnitude of th shift being a function of the velocity of such movement.

The return signal is thus a spectrum of frequencies, substantially symmetrical about the carrier frequency, the width of the spectrum being a function of the speed of the ship relative to the ground over which the ship is traveling.

The Doppler shifted return signal (200± KHz) is received by the receiving transducer, 16 and applied to a bandpass amplifier with an adjustable band from about 10,000 Hertz or cycles (10KHz) at the cennter frequency of 200KHz. The amplified 200 ± KHz wave is applied to a Demodulator, 21 which may include a rectifier, either half wave or full wave may be used, and a filter for providing a signal at 104 corresponding to the amplitude modulation of the 200 ± KHz signal. The signal is AC coupled to a Threshold Crossing Detector 108 so that the signal 105 applied to Threshold Crossing Detector 108 is essentially the envelope of the amplitude modulation function of the 200 ± KHz signal.

The power spectrum of the return signal and therefore the power spectrum of the envelope of the return signal are relatively invarient to the phase changes in the carrer signal caused by the pitching, rocking and vertical motion of the ship with respect to the ocean bottom, essentially nullifying the adverse effect of these factors.

In practice, the 200 ± KHz signal is rectified and is low pass filtered to remove the carrier frequency. The result is a spectrum of frequencies corresponding to the Doppler shifted portion of the reflected signal with some of the 200KHz ripple. With a low pass filter cut off of 10KHz, the output 104 is an amplitude modulated envelope of frequencies which correspond to the beat frequency which may be analyzed to determine velocity of the ship.

The envelope function 105 is detected by AC coupling the signal 104 to the signal analysis stage. Threshold Crossing Detector 108 looks at the crossings of a sine wave, corresponding to the envelope function at some predetermined level.

It may be shown that, for an AM waveform the rate at which the envelope of the waveform crosses the average RMS value of the waveform is identically equal to the standard deviation of the power spectrum of the waveform multiplied by a constant. The envelope 104 of the AM return signal is AC coupled to a zero crossing detector. This signal is represented as 105. The AC coupling centers the DC level of the envelope at 0 volts DC, as in FIG. 4. The time constant of the coupling may be several seconds. This then is a means by which the average RMS value of the waveform may be located. Crossings of this level by the envelope are detectable by means of a zero crossing detector.

The signal analysis function operates on a demodulated output signal and produces a voltage output linearly proportional to the average number of predetermined level crossings per time. The output voltage is passed through a resistance in series with a meter which responds to the analog function of the signal. The meter may be calibrated in miles per hour or in knots, a deflecting needle or pointer indicating the value of the speed of the ship.

The return signal to be analyzed is in an amplitude modulated form. The standard representation of an amplitude modulated (AM) waveform is:

$$A (\cos Wmt + B) \cos (Wct + \phi(t)) \quad (1)$$

where:
- $Wm$ = modulating angular frequency
- $Wc$ = carrier angular frequency
- $\phi(t)$ = time varying carrier phase (may be zero)
- $A,B$ = arbitrary constants It can be seen that this wave actually contains several frequency components.

$$A (\cos Wmt + B) \cos (Wct + \phi(t)) = A/2 \cos [Wm + Wc) t + \phi(t)] + A/2 \cos [Wc - Wm) t \phi(t)] + AB \cos (Wct + \phi(t)) \quad (2)$$

As seen the AM wave form actually contains three frequencies in its frequency spectrum; namely
Wc + Wm
Wc − Wm
Wc In operating on the return signal 200 ± KHz, the object is to isolate the AM wave form so that the modulating function, cos Wmt, is recovered. In the return signal, the sidebands of the carrier Wc are not impulses at Wc + Wm
Wc − Wm but are actually the Doppler Effect functions, therefore, the modulatly function may be represented as the sum of frequencies between the maximum and minimum Doppler shift.

$$\sum_{M=\min}^{M=\max} Cm \cos Wmt \quad (3)$$

The form of the return signal, $r(t)$, will be:

$$r(t) = A[\sum_{M=\min}^{M=\max} Cm \cos Wmt + B] \cos (Wct + \phi(t)).$$

If the return signal is multiplied by cos (Wct + $\phi$ (t)), a signal which tracts the return signal both in frequency and phase, the demodulation produces:

$$r(t)\cos(Wct + \phi(t)) = \frac{A}{4} \sum_{M=\min}^{M=\max} Cm [\cos Wmt + \cos((2Wc + Wm)t + 2\phi(t))] \quad (5)$$

$$+ \frac{A}{4} \sum_{M=\min}^{M=\max} Cm [\cos Wmt + \cos((12Wc - Wm)t + 2\phi(t))]$$

$$+ \frac{AB}{2} \cos(2Wct + 2\phi(t)) + \frac{AB}{2}$$

When filtered to remove high frequency terms the result is:

$$r(t) \cos (Wct + \phi(t)) = \frac{A}{2} \sum_{M=\min}^{M=\max} Cm \cos Wmt + \frac{AB}{2} \quad (6)$$

This shows that multiplication produces no phase dependence from the time varying phase of the return carrier.

The above results may be put into continuous spectrum form by letting M designate the continuous spectrum modulating function in the time domain, such as:

$$r(t) = A(M+B) \cos (Wct + \phi(t)) \quad (7)$$

When $r(t)$ is multiplied by cos $(Wct + \phi(t))$ and filtered to eliminate high frequency components the result is:

$$r(t) \cos (Wct + 100 (t)) = A/2 (M+B) \quad (8)$$

This shows that phase independence is acquired. The desired modulating function thus derived, the problem becomes one of frequency analysis which is accomplished by the Threshold Crossing Detector 108.

Although I have shown one method of demodulating the return signal to provide the amplitude modulation function, other known methods may be used.

The Threshold Crossing Detector 108 detects the demodulated signal 105 by means of a zero crossing or threshold crossing response circuit. Detection can be made as the sine wave crosses zero and thus measure the number of zero crossings of the wave per time. This is seen in FIG. 4.

The signal 105 may be applied to a threshold detection circuit which provides a pulse output each time the sine wave crosses a predetermined voltage level. The predetermined voltage level is preferably zero voltage of the sine wave. The voltage pulses occur at a frequency which is a function of the standard deviation of the power spectrum of the return signal. The voltage pulses may be averaged on a time basis as by applying the pulses to an averaging circuit to provide an analog voltage which may be used to drive or defect a pointer or indicator on a meter calibrated in miles per hour or knots.

The voltage pulses may also be applied, in digital form, to a time gated counter or accumulator which may provide a digital output corresponding to miles traveled.

As is well known, the velocity of sonic energy in water is substantially 1500 meters per second. Since the present invention embodies the transmission of energy from a moving source and the detection and analysis of the same energy reflected from a medium over which the source is traveling, it becomes evident that a reception zone for best reception of the reflected signal is essentially formed in a zone about the carrier frequency, which reception zone will shift position in accordance with the speed of the ship and the distance between the transmitter and the reflecting medium. It may be desired to separate the transmitter from the receiver and in fact position the transmitter forward of the reception zone based on average speed of the ship and depth of water. This becomes more evident when the ship is over a deep part of the ocean and its speed is reltively high. Actually in some cases it may be desired to position the transmiitter as far forward on the ship as practical and use two or more receivers for detecting or receiving the returned signal, each receiver being spaced from the transmitter different distances toward the aft or rear of the ship so as to be capable of detecting the received signal in different reception zones along the bottom of the hull of the ship. With a continuous wave system, such as disclosed herein, closed proximity of the transmitter and receiver appears to limit the operating parameter of the system. Wide proximity of the transmitter and receiver would function to increase the range of the device with respect to its use in deep water and on high speed ships while requiring more basic power to drive the transmitter.

Although the disclosure herein has described a continuous signal transmission system as the successfully practiced embodiment the principals of the present invention may be used in a pulse signal transmission system. A pulse signal transmission system would include timing functions not known herein but are within the state of the art.

The principals of the present invention may be embodied in a speed detection and indicating system adapted to receive scatter back from particles in the water in which a vehicle is traveling. The principals of the present invention remain valid where a Doppler speedometer system is provided for a vehicle traveling in the air. It may be desired to use frequencies other than in the sonic range, especially where a Doppler speedometer system is provided for a vehicle traveling in the air:

This invention is further described in a thesis titled An Inexpensive Doppler Speedometer by Kermit Hamlin Robinson, the inventor of the invention described herein. This thesis was submitted to the Department of Ocean Engineering of Massachusetts Institute of Technology on May 12, 1975 by the Author-Inventor. This thesis was accepted and subsequently placed, as a public document, in the library at Massachusetts Institute of Technology some time after its acceptance and this thesis is made a part of this disclosure by reference hereto.

A successful embodiment employing the principals of the invention has been described and alternate arrangements and usage of the invention have been mentioned. Other alternate arrangements and substitution of parts may be made, as will be familiar to those skilled in the art, without departing from the scope of the invention.

What is claimed is:

1. A device for determining the speed of a vehicle traveling through a medium, with respect to the ground over which said vehicle is traveling, said device including
   means for generating a carrier signal of predetermined frequency,
   means for transmitting said carrier signal through said medium in a beam directed at said ground, the center of said beam being at a predetermined angle to the line of travel of said vehicle through said medium,
   means for receiving said carrier signal reflected from said ground,
   means for detecting the power spectrum of the reflected signal, said power spectrum being a function of speed of said vehicle,
   means for detecting a characteristic of said power spectrum for providing an electrical value that is proportional to said characteristic, and
   calibrated means responsive to said electrical value for indicating the speed of said vehicle with respect to said ground.

2. A device for determining the speed of a vehicle as in claim 1 and in which said medium is water and said carrier signal is in the ultra-sonic range.

3. A device for determining the speed of a vehicle as in claim 1 and in which said characteristic of said power spectrum is width of said power spectrum.

4. A device for determining the speed of a vehicle as in claim 1 and in which said characteristic of said power spectrum is standard deviation of said power spectrum.

5. A device for determining the speed of a vehicle as in claim 1 and in which said electrical value is voltage.

6. A device for determining the speed of a vehicle as in claim 1 and in which said electrical value is frequency.

7. A device for determing the speed of a vehicle as in claim 1 and in which said predetermined angle at which the center of said beam is directed is substantially perpendicular to the line of travel of said vehicle.

8. A system for determining and indicating the speed of a vehicle traveling through a medium with respect to the ground over which the vehicle is traveling, said system including,
   a power supply,
   generator means driven by said power supply for generating a carrier signal having predetermined characteristics,
   transmitter means for transmitting said carrier signal in a beam at a predetermined angle from said vehicle toward said ground,
   receiver means for receiving said carrier signal reflected from said ground, said carrier signal characteristics being changed to provide a spectrum of frequencies,
   means for determining a characteristic of the power spectrum of said spectrum of frequencies, means for analyzing said power spectrum characteristic for determining the value of said power spectrum characteristic for providing a driving output proportional to the average value of said power spectrum characteristic, and indicator means driven by said driving output and calibrated in speed for indicating the speed of said vehicle.

9. A system for determining and indicating the speed of a vehicle as in claim 8 and in which said medium is water.

10. A system for determining and indicating the speed of a vehicle as in claim 8 and in which said carrier signal is in the ultra-sonic range and said predetermined characteristics of said carrier signal are frequency.

11. A system for determining and indicating the speed of a vehicle as in claim 8 and in which said predetermined characteristics of said carrier signal are frequency.

12. A system for determining and indicating the speed of a vehicle 8 and in which said driving output is an analog voltage.

13. A system for determining and indicating the speed of a vehicle as in claim 8 and in which said means for analyzing further provides a second driving output proportional to the average value of said power spectrum characteristics and said system further includes odometer means driven by said second driving output for indicating miles traveled by said vehicle over said ground.

14. A system for determining and indicating the speed of a vehicle as in claim 13 and in which said driving output is an analog voltage and said second driving output is a digital voltage.

15. A system for determining and indicating the speed of a vehicle as in claim 8 and in which said predetermined angle from said vehicle is perpendicular to the line of travel of said vehicle.

16. A system for determining and indicating the speed of a vehicle as in claim 8 and in which said predetermined characteristics of said carrier signal are frequency.

17. A system for determining and indicating the speed of a vehicle as in claim 8 and in which said characteristic of the power spectrum is standard deviation.

18. A system for determining and indicating the speed of a vehicle as in claim 8 and in which said characteristic of the power spectrum is width of said power spectrum.

19. A device for determining the velocity of a vehicle with respect to ground, said vehicle suspended in a medium over said ground, said device including means for generating a continuous signal of predetermined characteristics, means for transmitting said continuous signal from said vehicle at a predetermined angle toward said ground, means for receiving said continuous signal reflected from said ground, said reflected signal including a spectrum of frequencies, having characteristics which are proportional to the velocity of said vehicle with respect to said ground, means for detecting said characteristics of said spectrum, means for generating an output, the value of which is proportional to said characteristics of said spectrum and indicator means responsive to said output for indicating velocity of said vehicle.

20. A device for determining the velocity of a vehicle as in claim 19 and in which said medium is water and said continuous signal is in the ultra-sonic range.

21. A device for determining velocity of a vehicle as in claim 20 and in which said predetermined characteristics of said continuous signal are frequency.

22. A device for determining velocity of a vehicle as in claim 20 and in which said predetermined characteristics of said continuous signal are frequency and said predetermined angle toward said ground is an angle substantially 90° to the line of travel of said vehicle.

23. A device for determining velocity of a vehicle with respect to ground said vehicle traveling in water over said ground, said device including means for generating a carrier signal in the ultrasonic range of predetermined frequency and amplitude, means for transmitting said carrier signal from said vehicle in a beam having predetermined width, the center of said beam being substantially perpendicular to the direction of travel of said vehicle in said water and being directed at said ground, means for receiving said carrier signal reflected from said ground, said reflected signal including reflection characteristics including a spectrum of frequencies, said spectrum having characteristics substantially proportional to the velocity of said vehicle with respect to said ground, means for detecting said spectrum of frequencies, means for generating an output having a value proportional to said characteristics of said spectrum, and indicator means responsive to said output and calibrated in velocity for indicating velocity of said vehicle.

24. A device for determining the velocity of a vehicle as in claim 23 and in which said output is a voltage having a value proportional to said characteristics of said spectrum.

25. A device for determining the velocity of a vehicle as in claim 23 and in which said means for generating generates an analog output voltage having an amplitude proportional to said characteristics of said spectrum and further generates a digital output voltage having frequency characteristics proportional to said characteristics of said spectrum.

26. A device for determining the velocity of a vehicle as in claim 23 and in which said carrier signal is a continuous signal.

27. A device for determining the velocity of a vehicle with respect to the ground over which said vehicle is traveling, said vehicle suspended in a medium over said ground, said device including means for generating a continuous signal of predetermined frequency, means for transmitting said continuous signal from said vehicle in a beam having width, the center of which is substantially perpendicular to the line of travel of said vehicle, said beam being directed toward the ground, means for receiving said continuous signal reflected from said ground, said reflected signal including a spectrum of frequencies having a power spectrum being proportional to the velocity of said vehicle with respect to said ground, means for detecting the standard deviation of said power spectrum, means for generating an output the value of which is proportional to said standard deviation of said power spectrum, and indicator means responsive to said output for indicating the velocity of said vehicle.

* * * * *